United States Patent
Abe et al.

(10) Patent No.: US 6,943,821 B2
(45) Date of Patent: Sep. 13, 2005

(54) ELECTRONIC ENDOSCOPE APPARATUS TO WHICH ELECTRONIC ENDOSCOPES WITH DIFFERENT NUMBERS OF PIXELS CAN BE CONNECTED

(75) Inventors: Kazunori Abe, Saitama (JP); Fujio Okada, Saitama (JP)

(73) Assignee: Fujinon Corporation, Saitama (JP)

( * ) Notice: Subject to any disclaimer, the term of this patent is extended or adjusted under 35 U.S.C. 154(b) by 450 days.

(21) Appl. No.: 10/101,345

(22) Filed: Mar. 20, 2002

(65) Prior Publication Data

US 2002/0140807 A1 Oct. 3, 2002

(30) Foreign Application Priority Data

Mar. 30, 2001 (JP) .................................. 2001-102275

(51) Int. Cl.[7] .............................................. H04N 7/18
(52) U.S. Cl. ...................................................... 348/65
(58) Field of Search ........................ 348/42–61, 62–92; H04N 7/18

(56) References Cited

U.S. PATENT DOCUMENTS

| 4,891,695 A | * | 1/1990 | Uchikubo et al. | ............ 348/72 |
| 4,894,715 A | * | 1/1990 | Uchikubo et al. | ............ 348/65 |
| 5,627,583 A | * | 5/1997 | Nakamura et al. | ............ 348/72 |

* cited by examiner

*Primary Examiner*—Tung Vo
(74) *Attorney, Agent, or Firm*—Snider & Associates; Ronald R. Snider (57) ABSTRACT

With a device that connects a processor device to electronic endoscopes having CCDs with different numbers of pixels, for example, 410, 270, or 190 thousand pixels mounted thereon, all the CCDs are driven at a frequency corresponding to 410 thousand pixels. Further, an information amount converting circuit enlarges an image obtained by the CCD with 270 or 190 thousand pixels in a horizontal direction and a vertical direction by using pixel interpolation. That is, data on a pixel to be interpolated is calculated by averaging pixels around this pixel, and enlarged binary data on this target pixel is obtained. A weighting factor is applied to this binary data, and the resultant data is added to the target pixel data. This process forms an image with an aspect ratio of 4:3.

4 Claims, 6 Drawing Sheets

|  | $P_2$ | $P_3$ | $P_4$ |
|---|---|---|---|
|  | 2 | 5.5 | 6 |
|  | 6 |  | 8 |
|  | $P_8$ |  | $P_{10}$ |

FIG.4(B)

|  | $P_2$ | $P_3$ | $P_4$ |
|---|---|---|---|
|  | 0 | 1 | 1 |
|  | 1 |  | 1 |
|  | $P_8$ |  | $P_{10}$ |

FIG.4(C)

|  | $P_2$ | $P_3$ | $P_4$ |
|---|---|---|---|
|  | 2 | 6.6 | 6 |
|  | 6 |  | 8 |
|  | $P_8$ |  | $P_{10}$ |

FIG.5(A)

| $P_2$ | 3 |  | 10 | $P_4$ |
|---|---|---|---|---|
| $P_8$ | 7 | 6.5 | 8 | $P_{10}$ |
| $P_{14}$ | 7 |  | 4 | $P_{16}$ |
|  |  | $P_9$ |  |  |

FIG.5(B)

| $P_2$ | 0 |  | 1 | $P_4$ |
|---|---|---|---|---|
| $P_8$ | 1 | 1 | 1 | $P_{10}$ |
| $P_{14}$ | 1 |  | 0 | $P_{16}$ |
|  |  | $P_9$ |  |  |

FIG.5(C)

| $P_2$ | 3 |  | 10 | $P_4$ |
|---|---|---|---|---|
| $P_8$ | 7 | 7.9 | 8 | $P_{10}$ |
| $P_{14}$ | 7 |  | 4 | $P_{16}$ |
|  |  | $P_9$ |  |  |

ELECTRONIC ENDOSCOPE APPARATUS TO WHICH ELECTRONIC ENDOSCOPES WITH DIFFERENT NUMBERS OF PIXELS CAN BE CONNECTED

BACKGROUND OF THE INVENTION

This application claims the priority of Japanese Patent Applications No. 2001-102275 filed on Mar. 30, 2001 which is incorporated herein by reference.

1. Field of the Invention

The present invention relates to a configuration of an electronic endoscope apparatus in which electronic endoscopes having image pickup elements with different number of pixels mounted thereon can be connected to a processor device.

2. Description of the Related Art

In an electronic endoscope apparatus, an electronic endoscope having a CCD (Charge Coupled Device) as an image pickup element at its top end is connected to a processor. A video signal acquired by the CCD undergoes a predetermined video processing in the electronic endoscope and the processor, whereby a video of the observed subject is displayed on a monitor.

In recent years, the electronic endoscopes mounting a CCD with a greater number of pixels have been manufactured in a relatively short cycle one after another to produce a high resolution video, whereby the electronic endoscopes having the CCD with a different number of pixels are connected to the same processor. For example, a CCD 1 having 410 thousand pixels, a CCD 2 having 270 thousand pixels, and a CCD 3 having 190 thousand pixels are provided, as shown in FIGS. 8A to 8C.

Figure 8A:
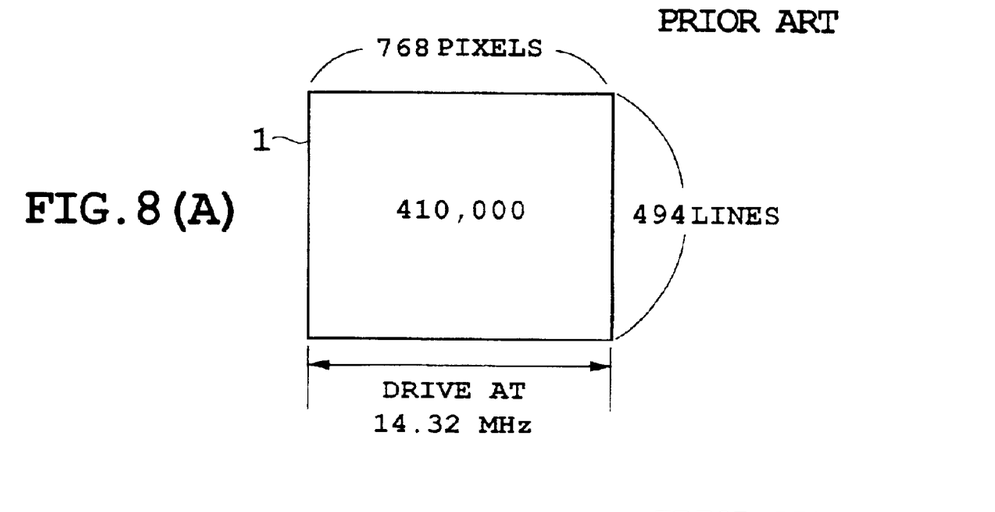
FIGS. 8(A) to 8(C) are views showing examples of configurations of conventional CCDs with different numbers of pixels.

The CCD 1 having 410 thousand pixels as shown in FIG. 8A has an image pickup area consisting of 768 pixels in a horizontal direction and 494 lines in a vertical direction. The CCD 2 having 270 thousand pixels as shown in FIG. 8B has an image pickup area consisting of 510 pixels in the horizontal direction and 492 lines in the vertical direction. And the CCD 3 having 190 thousand pixels as shown in FIG. 8C has an image pickup area consisting of 362 pixels in the horizontal direction and 492 lines in the vertical direction.

However, with this conventional electronic endoscope apparatus, since electronic endoscopes having CCDs with different numbers of pixels mounted thereon can be connected to the same processor device, different frequencies (which are required to drive the CCDs and process signals) is generated correspondingly to the number of pixels, thereby requiring complicated circuits and signal processing.

Figure 8B:
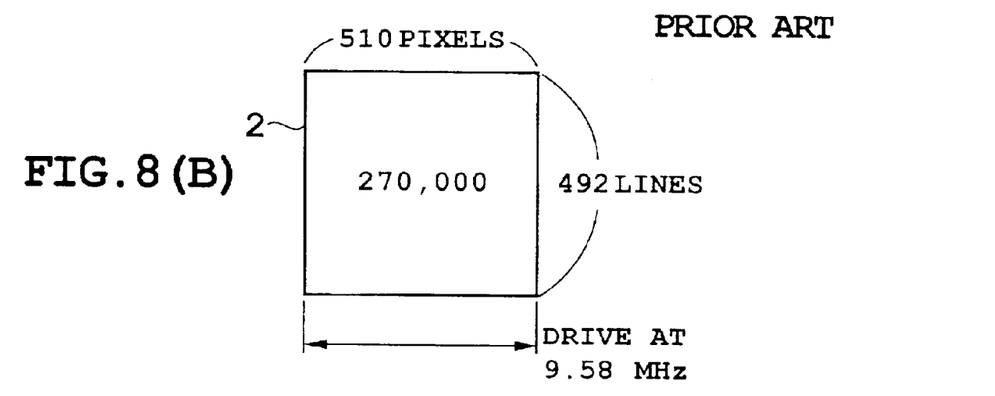
Figure 8C:
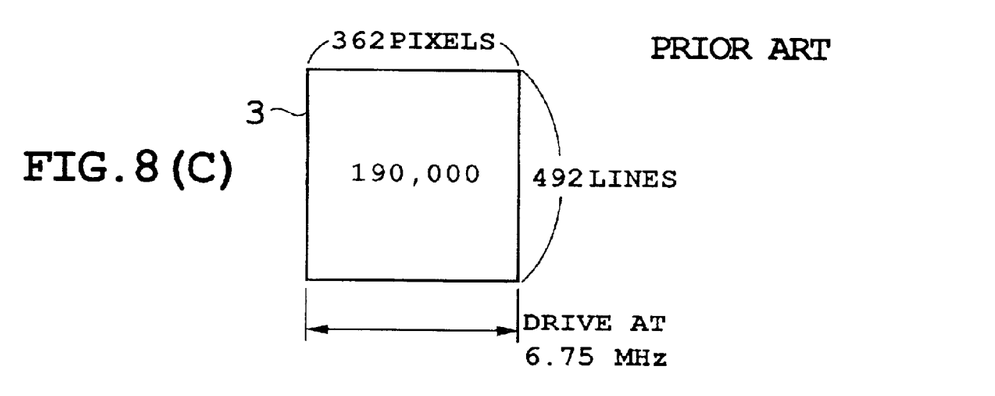

That is, as a drive frequency required to read out pixel information, 14.32 MHz is used for the 410 thousand pixels in FIG. 8(A), 9.58 MHz is used for the 270 thousand pixels in FIG. 8(B), and 6.75 MHz is used for the 190 thousand pixels in FIG. 8(C). Accordingly, these drive frequencies and other signal processing frequencies must be formed correspondingly to the numbers of CCD pixels in the electronic endoscope, thus requiring complicated circuits for generating these frequencies as well as complicated video processing based on these frequencies.

SUMMARY OF THE INVENTION

The present invention is achieved in view of the above problems, and it is an object thereof to provide an electronic endoscope apparatus that can easily execute video processing using image pickup elements with different numbers of pixels and obtain an image of appropriate quality, while making the frequency for CCD driving and signal processing independent of the number of pixels.

To attain this object, the present invention provides an electronic endoscope apparatus in which electronic endoscopes having image pickup elements with different numbers of pixels mounted thereon can be connected to a processor device, characterized by comprising a signal processing circuit which drives the image pickup elements with the different numbers of pixels at a frequency set on the basis of a reference pixel number and which executes video processing on the basis of the frequency, and an information amount converting circuit that operates if an electronic endoscope having an image pickup element with pixels the number of which is different from the reference pixel number is connected to the apparatus, to execute pixel interpolation comprising a process of extracting a characteristic value for peripheral pixel information to compensate for the lack of pixel information, thereby forming an image of a predetermined aspect ratio.

Another aspect of the present invention is characterized in that the information amount converting circuit is composed of an image enlarging circuit that enlarges an image obtained by the image pickup element by executing an interpolation process of averaging peripheral pixels, a binarization circuit that forms a binarized image of the image obtained by the image pickup element, a binary image enlarging circuit that enlarges the binary image using an interpolation process, and an addition circuit that adds data obtained by applying a weighting factor to binary data output from the binary image enlarging circuit, to image data output from the image enlarging circuit. The weighting factor can be set depending on an average value for peripheral pixels or on an average value for peripheral pixels having a pixel value larger than a predetermined threshold.

With the above configuration, even if, for example, a drive frequency of 14.32 MHz, used for the 410 thousand pixels (reference pixel number), is used and an electronic endoscope having a CCD with 270 or 190 thousand pixels or the like is connected to the apparatus, then the pixels of the CCD are read out at the drive frequency, and video processing is executed on the basis of a horizontal synchronizing signal, a vertical synchronizing signal, or the like formed on the basis of this frequency. The information amount converting circuit executes a pixel interpolating process of extracting the characteristic value, to increase the number of pixels in the horizontal direction for the 270 thousand pixels and in the horizontal and vertical directions for the 190 thousand pixels or another number of pixels. As a result, a video with an aspect ratio of 4:3 is displayed on a monitor.

Further, in the present invention, videos of appropriate quality are obtained by executing the pixel interpolating process of extracting a characteristic value for peripheral pixels. That is, when the number of pixels is increased as described above, if adjacent pixel data is simply used to compensate for the lack of pixel data, the video may be difficult to observe due to emerging step-shaped jags. Accordingly, in the present invention, the pixel interpolating process of extracting a characteristic value is preferably executed with the above configuration of the present invention.

That is, with the above configuration of the present invention, the image enlarging circuit determines an average value for pixels around a pixel to be interpolated, and the binary image enlarging circuit obtains binary value data for this target pixel. Then, for example, this binary data is multiplied by a weighting factor depending on the average value for the pixels, so that this weighting factor-multiplied value and the average pixel value are added together to obtain a value as interpolated pixel data.

This process allows the characteristic value to be extracted by using an enlarged binary (image) data and weighting factor. That is, the binary data is 0 when smaller than a threshold value of a pixel signal level (for example, an intermediate value of a variable-density level) and is 1 when equal to or larger than the intermediate value. With this process, which uses binary data, when the signal level has the threshold or a larger value, the pixel value is emphasized as a characteristic value compared to the case where the signal level has a smaller value. When the signal level has the threshold or a larger value, the characteristic value is further emphasized by a weighting factor.

DETAILED DESCRIPTION OF THE PREFERRED EMBODIMENTS

Figure 1:
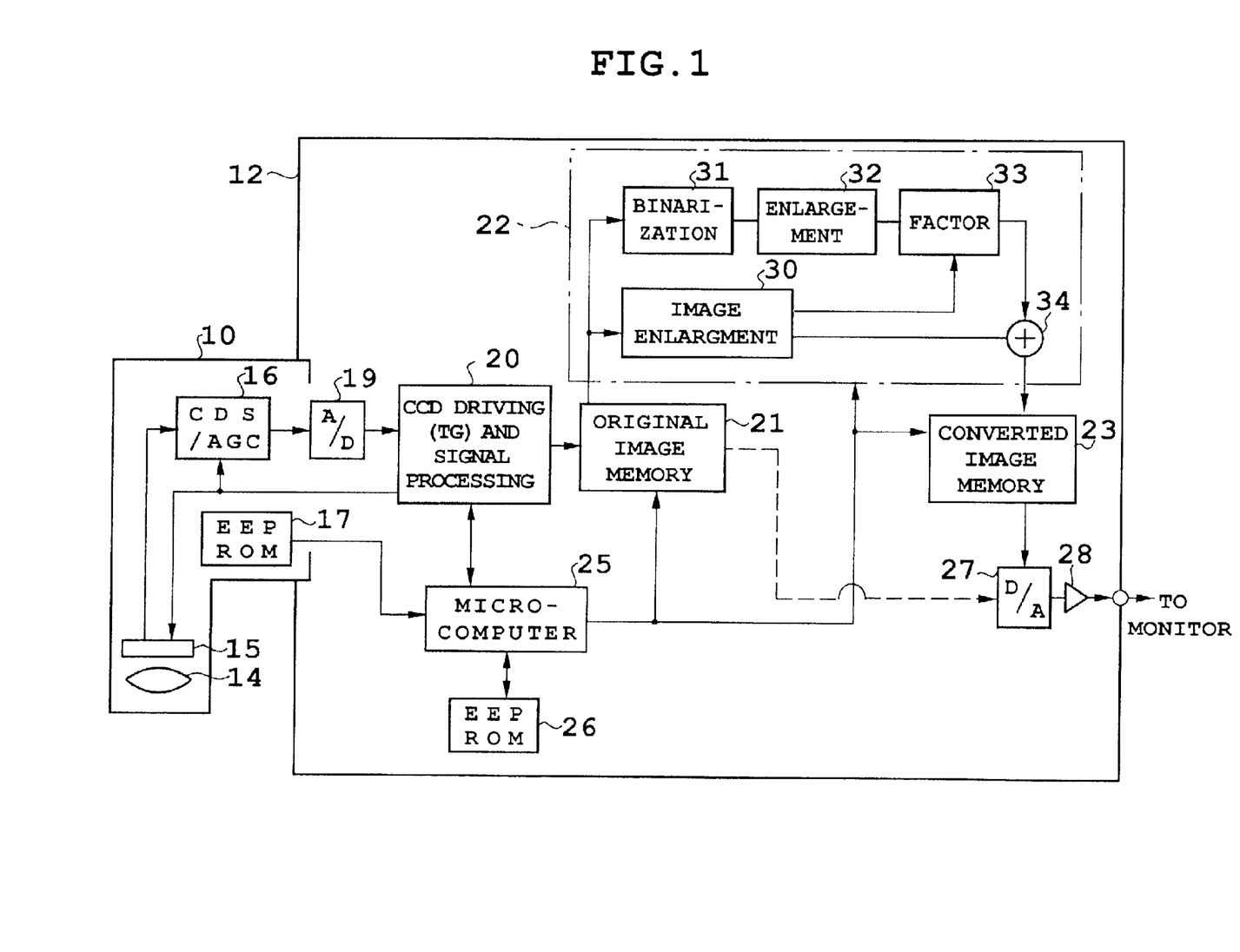
FIG. 1 is a block diagram showing a configuration of a circuit in an electronic endoscope apparatus according to an embodiment of the present invention.

FIG. 1 shows a configuration of an electronic endoscope apparatus according to an embodiment of the present invention. In this apparatus, an electronic endoscope 10 is connected to a processor device 12. The electronic endoscope 10 has a CCD 15 provided at a tip thereof via an objective optical system 14. The CCD 15 has 410 thousand, 270 thousand, 190 thousand or another number of pixels. The electronic endoscope has a CDS/AGC circuit 16 or the like arranged therein to execute correlation double sampling (CDS) and automatic gain control (AGC) on output signals from the CCD 15. The electronic endoscope also has a ROM (EEPROM) 17 storing data or the like which identifies the number of pixels in the CCD 15 so that the data in the ROM 17 is transmitted to the processor device 12 upon power-on or the like.

On the other hand, the processor device 12 is provided with an A/D converter 19 that receives an output signal from the CDS/AGC circuit 16 and a CCD driving and video signal processing circuit 20 that generates a drive signal for the CCD 15 and executes various processes such as color conversion, gamma correction, and contour emphasis on an output signal from the CCD 15. The CCD driving and video signal processing circuit 20 is provided with a timing generator (TG) having an oscillator to generate a 14.32-MHz pixel driving frequency used for the CCD 15 with 410 thousand pixels and to provide various timing signals such as a 15.734-kHz horizontal synchronizing signal, a 59.94-Hz vertical synchronizing signal, and other sampling frequencies all of which are formed from this oscillation frequency.

The CCD driving and video signal processing circuit 20 is followed by an original image memory 21 that directly stores an output video signal from the circuit 20, an information amount converting circuit 22 that compensates for the amount of pixel information (executes an interpolation process) when the CCD 15 having pixels the number of which is not 410 thousand is connected to the apparatus, and a converted image memory 23 that stores a video signal on which information amount conversion has been executed.

The processor device is also provided with a microcomputer 25 that controls the information amount conversion and unifies and controls the circuits as well as a ROM (EEPROM) 26. The information amount converting circuit 22 is followed by a D/A converter 27, a buffer 28, and others. A video signal output from the buffer 28 is supplied to the monitor.

The information amount converting circuit 22 is internally provided with an image enlarging circuit 30 that enlarges an image on the basis of image data output from the original image memory 21, using, for example, a pixel interpolating process that averages peripheral pixel data, a binarization circuit 31 that forms a binarized image from image data output from the original image memory 21, a binary image enlarging circuit 32 that enlarges the binarized image using a pixel interpolating process, a factor calculating circuit 33 that multiplies a weighting factor on the basis of an average value for peripheral pixels obtained by the image enlarging circuit 30, and an addition circuit 34 that adds an output from the factor calculating circuit 33 and an output from the image enlarging circuit 30 together.

That is, the image enlarging circuit 30 uses a nearest neighbor method of determining the average value of horizontal and vertical pixel (signal) levels of pixels adjacent to a pixel to be interpolated, but may use a bilinear method of determining the average value of the horizontal pixel levels. Further, if for example, 256 pixel levels are used, the binarization circuit 31 uses an intermediate value as a threshold to convert levels lower than level 128 into 0 and level 128 and higher levels into 1 (if 10 pixel levels are used, levels lower than level 5 are converted into 0, while level 5 and higher levels are converted into 1), and the binary image enlarging circuit 32 enlarges this binary image using an interpolation process. This interpolation may be the nearest neighbor method, the bilinear method, or a bicubic method for simple enlargement based on the direct insertion of values for adjacent pixel levels.

The embodiment is constructed as described above, and its operation will be described below. First, in the electronic endoscope apparatus in FIG. 1, when the processor device 12 is powered on, it communicates with the electronic endoscope 10 (ROM 17) to allow the microcomputer 25 to determine the number of pixels in the CCD 15. On the other hand, the CCD 15 of the electronic endoscope 10 is supplied with the 14.32-MHz pixel driving frequency formed by the CCD driving and video signal processing circuit 20 as well as a horizontal and vertical synchronizing signals and other signals formed on the basis of this frequency. Charges accumulated as pixels are read out from the CCD 15 at this frequency as image data. Further, the CDS/AGC circuit 16 is supplied with a sampling frequency or the like, and a video signal sampled and amplified in this circuit is provided to a signal processing section of the CCD driving and video signal processing circuit 20 via the A/D converter 19. The signal processing section executes color conversion, gamma correction, or another process required to form a video.

Then, an output from the CCD driving and video signal processing circuit 20 is supplied to the information amount converting circuit 22. However, if the microcomputer 25 determines that the CCD 15 of the electronic endoscope 10 has 410 thousand pixels, then the converting circuit 22 does not execute information amount conversion. That is, the video signal is stored in the original image memory 21 and then output to the monitor via the D/A converter 27 and buffer 28. The monitor displays a video of a subject picked up by the CCD 15 with 410 thousand pixels.

Figure 2:
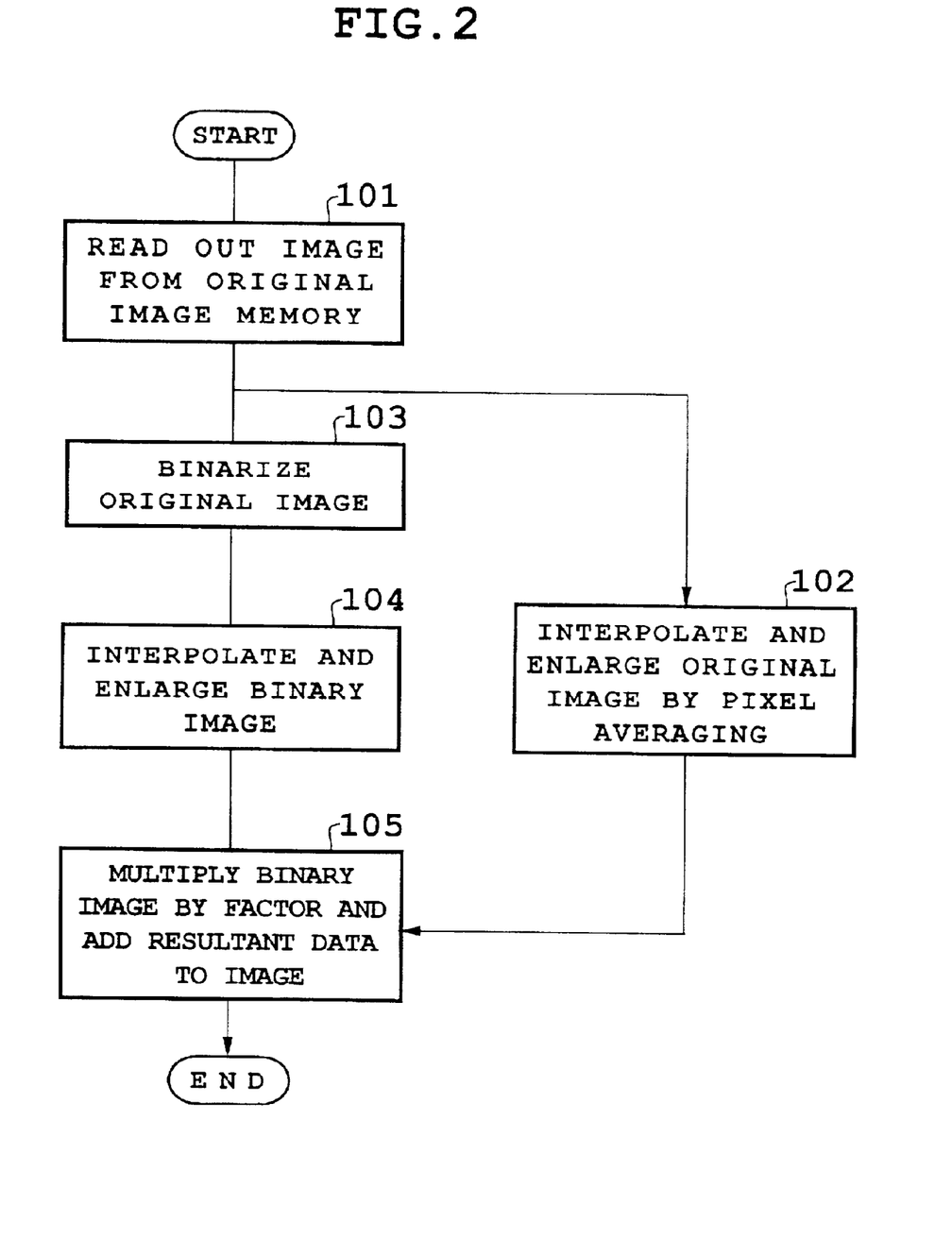
FIG. 2 is a flow chart showing an information amount converting process according to the embodiment.

On the other hand, if the microcomputer 25 determines that the CCD 15 of the electronic endoscope 10 has 270 or 190 thousand pixels, then the information amount converting circuit 22 uses the steps shown in FIG. 2 to execute information amount conversion for enlargement. That is, the output from the CCD driving and video signal processing circuit 20 is stored in the original image memory 21 for each field, and subsequently one field of the image is read out therefrom (step 101 in FIG. 2). The image enlarging circuit 30 executes pixel interpolation on this image in the horizontal and vertical directions on the basis of pixel averaging (step 102).

Figure 3A:
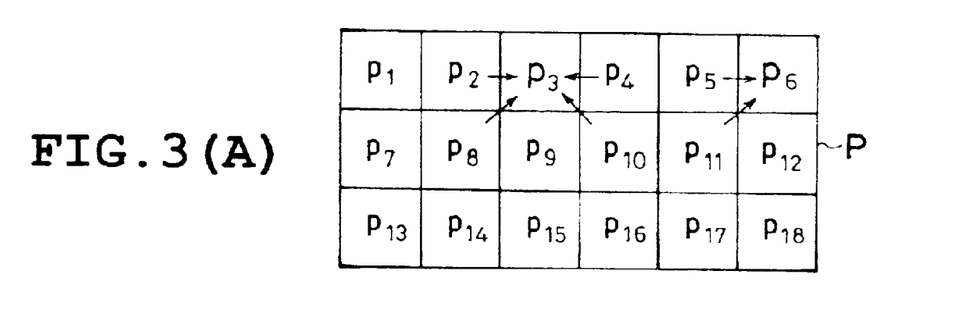
FIGS. 3(A) to 3(C) are explanatory representations illustrating examples of pixel interpolation based on averaging according to the embodiment.
Figure 3B:
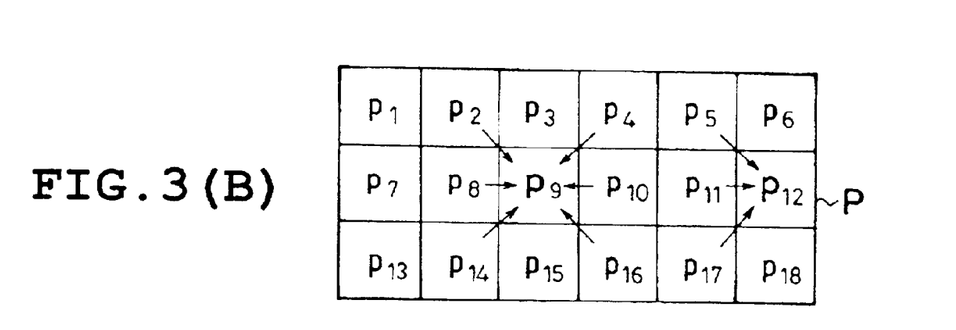
Figure 3C:
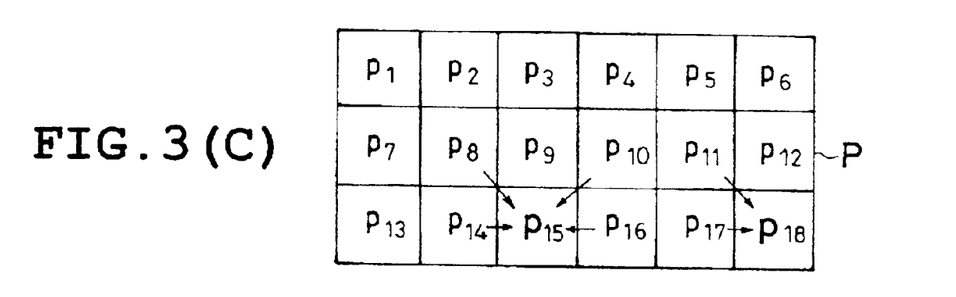

FIGS. 3(A) to 3(C) show an averaging operation performed on peripheral pixels by the image enlarging circuit 30 and binary value enlarging circuit 32. As shown in an image P, an averaging operation is performed on pixels located horizontally and obliquely adjacent to target pixels. For example, as shown in FIG. 3(A), for a pixel $p_3$, the calculation $p_3=(p_2+p_4+p_8+p_{10})/4$ is executed, and for a pixel $p_6$, the calculation $p_6=(p_5+p_{11})/2$ is executed. As shown in FIG. 3(B), for a pixel $p_9$, the calculation $p_9=(p_2+p_4+p_8+p_{10}+p_{14}+p_{16})/6$ is executed, and for a pixel$_{12}$, the calculation $p_{12}=(p_5+p_{11}+p_{17})/3$ is executed. As shown in FIG. 3(C), for a pixel $p_{15}$, the calculation $p_{15}(p_8+p_{10}+p_{14}+p_{16})/4$ is executed, and for a pixel $p_{18}$, the calculation $p_{18}=(p_{11}+p_{17})/2$ is executed.

Figure 4A:
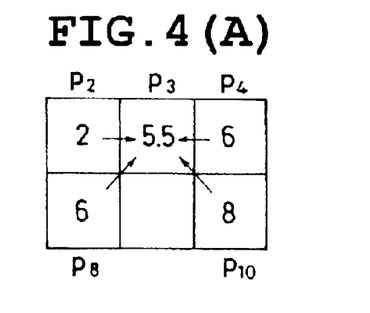
FIGS. 4(A) to 4(C) are explanatory representations illustrating a pixel interpolating process for an upper pixel of an image formed according to the embodiment.

FIGS. 4(A) to 4(C) show a pixel interpolating process on the pixel $p_3$, located in the upper part of FIG. 3(A). If ten signal levels are used for simplification and pixels around the $p_3$ have values of 2, 6, 6, and 8, as shown in FIG. 4(A), then the image enlarging circuit 30 obtains an average value of 5.5.

Figure 4B:
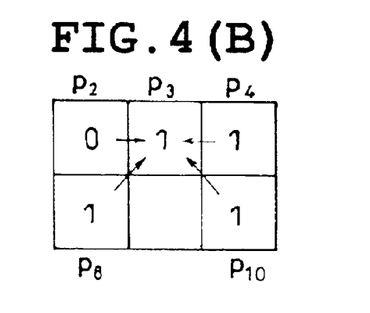

On the other hand, the binarization circuit 31 in FIG. 1 binarizes original image data (step 103 in FIG. 2), and the subsequent binary image enlarging circuit 32 interpolates and enlarges the binary image (step 104 in FIG. 2). The binary data on this target pixel $p_3$ is as shown in FIG. 4(B). That is, with the ten levels, levels lower than level 5 is represented as 0, whereas level 5 and higher levels are represented as 1. Accordingly, $p_2=0$, and $p_4$, $p_8$, and $p_{10}=1$, and averaging these values results in $p_3=1$. The subsequent factor calculating circuit 33 multiplies this binary data by a weighting factor and adds the result to an output from the image enlarging circuit 30 (step 105 in FIG. 2).

Figure 4C:
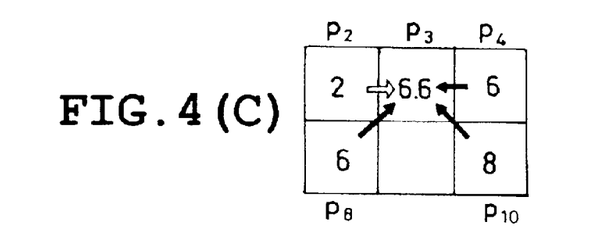

This weighting factor is determined on the basis of the average of peripheral pixel values or the distribution of these values, and is essentially set depending on the average value for the peripheral pixels. For example, a weighting factor of 1.1 is set for the above peripheral pixel average value of 5.5, and the factor calculating circuit 33 outputs 1×1.1=1.1. Consequently, as shown in FIG. 4(C), the final pixel value for the pixel $p_3$ is 5.5+1.1=6.6. Therefore, this characterization results in a level higher than that obtained by simple averaging.

Figure 5A:
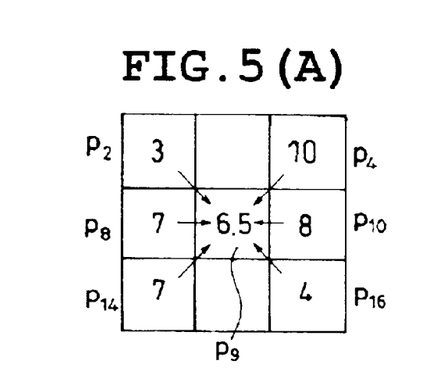
FIGS. 5(A) to 5(C) are explanatory representations illustrating a pixel interpolating process for an intermediate pixel of an image formed according to the embodiment.
Figure 5B:
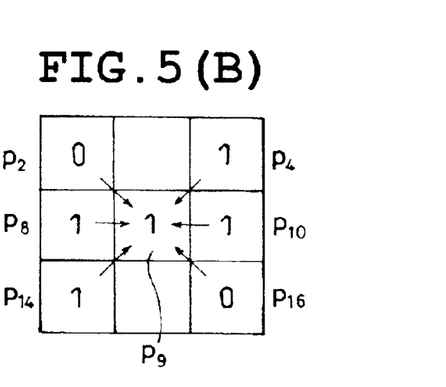

FIGS. 5(A) to 5(C) show a pixel interpolating process executed on the pixel $p_9$, located in the center of the image P in FIG. 3(A). If peripheral pixels have values of 3, 10, 7, 8, 7, and 4, the image enlarging circuit 30 obtains an average value of 6.5 for the pixel $p_9$ as shown in FIG. 5(A). Further, the binarization circuit 31 obtains binary data for each pixel, that is, $p_2$ and $p_{16}=0$ and $p_4$, $p_8$, $p_{10}$, and $p_{14}=1$ as shown in FIG. 5(B). Thus, binary data for the pixel $p_9$ is $p_9=1$.

Figure 5C:
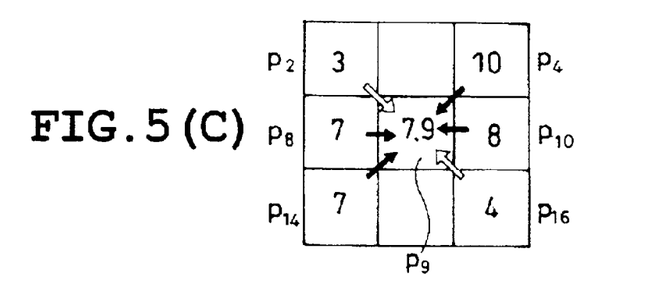

Then, for example, a weighting factor of 1.4 is set for the above average value of 6.5, so that an output from the factor calculating circuit 33 is 1.4 (=1×1.4). Accordingly, as shown in FIG. 5(C), the final pixel value for the pixel $p_9$ is 6.5+1.4=7.9. Therefore, this characterization results in a level higher than that obtained by simple averaging.

The weighting factor in the above embodiment is not the average value for all the peripheral pixels but for example, an average value for only pixels having a pixel value larger than a threshold such as an intermediate value. For example, in the example in FIG. 4(C), the value 2 for the pixel p2 is excluded, and a weighting factor of, for example, 1.5 for the average value (=6.7) of 6, 6, and 8 is used to execute the addition 5.5+1.5=7. Further, in the example in FIG. 5(C), the value 3 for the pixel $p_2$ and the value 4 for the pixel $p_{16}$ are excluded, and a weighting factor of, for example, 1.7 for the average value (=8) of 10, 7, 8, and 7 is used to execute the addition 6.5+1.7=8.2. In this manner, the characterization can be made clearer.

Figure 6:
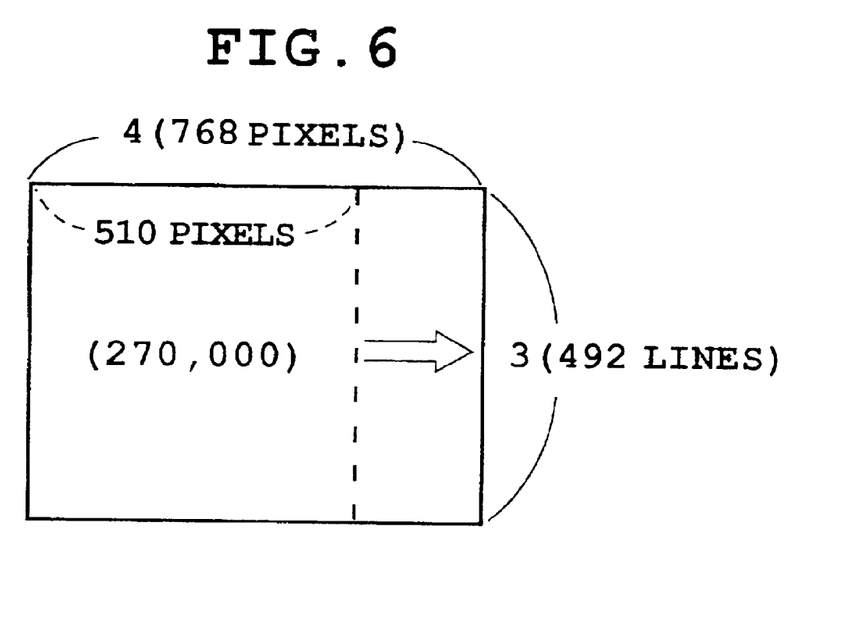
FIG. 6 is a view showing an information amount conversion for an image obtained using a CCD with 270 thousand pixels according to the embodiment.

Thus, when the CCD 15 of the electronic endoscope 10 connected to the processor device 12 has 270 thousand pixels, the information amount converting circuit 22 increases the amount of information only in the horizontal direction. This is shown in FIG. 6, and the 510 pixels in the horizontal direction are increased to 768 in the above-described manner. On the other hand, 492 lines are present in the vertical direction and thus the difference between this number and the corresponding number for the 410 thousand pixels is only two, so that this value is used as it is. Then, an image with an aspect ratio of 3 (vertical direction):4 (horizontal direction) can be displayed on the monitor.

Figure 7:
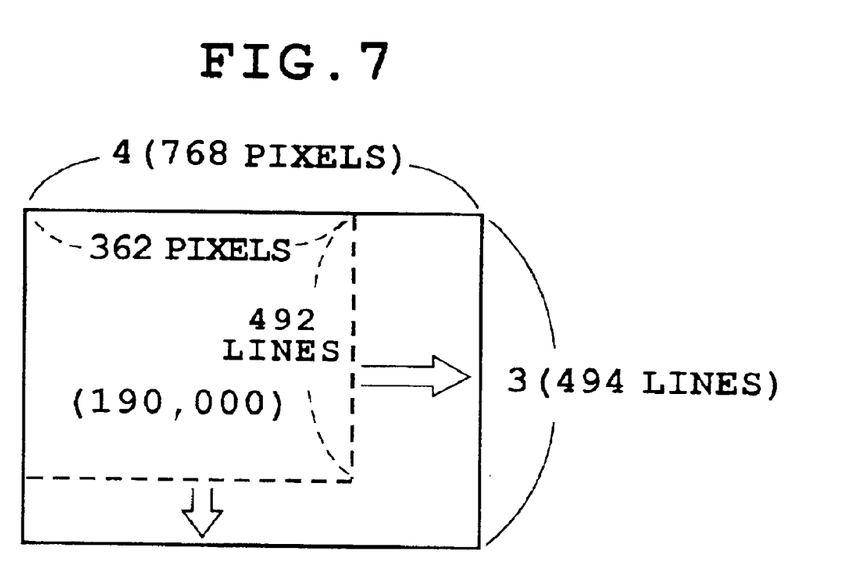
FIG. 7 is a view showing an information amount conversion for an image obtained using a CCD with 190 thousand pixels according to the embodiment.

On the other hand, when the CCD 15 of the electronic endoscope 10 connected to the processor device 12 has 190 thousand or another number of pixels, the information amount converting circuit 22 increases the amount of information in not only horizontal but also vertical directions on the basis of pixel interpolation. This vertical pixel interpolation is similarly carried out using the method shown in FIGS. 4 and 5. This is shown in FIG. 7, and the 362 pixels in the horizontal direction are increased to 768, with 492 lines increased to 494. Then, likewise, an image with an aspect ratio of 3:4 can be displayed on the monitor.

In the binary data process in the above embodiment, the threshold value is the intermediate value of the signal level, and levels smaller than this intermediate value are set to 0, whereas levels equal to or larger than it are set to 1. However, by setting the threshold value smaller or larger than the intermediate value, the level of the characterization can be adjusted in a manner different from that with the above weighting factor.

As described above, according to this embodiment, if an electronic endoscope having an image pickup element with pixels the number of which is different from a reference pixel number is connected to the electronic endoscope apparatus, a characteristic value for peripheral pixel information is extracted by using pixel interpolation, to form a video with a predetermined aspect ratio. Consequently, video processing can be easily executed by using image pickup elements with different numbers of pixels, while making the frequency for CCD driving and signal processing independent of the number of pixels, thereby eliminating the needs for complicated circuits or processes.

Further, according to this embodiment, data on a pixel to be interpolated is calculated by using an interpolation process based on the averaging of peripheral pixels, and enlarged binary data is obtained for this target pixel. Then, a weighting factor is applied to this binary data, and the resultant data is added to the target pixel data. Consequently, an image obtained by using an image pickup device with a small number of pixels can be reproduced so as to appear equivalent to one obtained by using an image pickup device with a large number of pixels, thereby providing a video that is easy to observe and is free from jags.

What is claimed is:

1. An electronic endoscope apparatus comprising:

various kinds of electronic endoscopes having image pickup elements with different numbers of pixels mounted thereon;

a processor to which these electronic endoscopes are connected;

a signal processing circuit arranged in said processor device and which drives said image pickup elements with the different numbers of pixels at a frequency set on the basis of a reference pixel number and which executes video processing on the basis of the frequency; and an information amount converting circuit arranged in said processor device and which operates if an electronic endoscope having an image pickup element with pixels the number of which is different from the reference pixel number is connected to the apparatus, to execute pixel interpolation comprising a process of extracting a characteristic value for peripheral pixel information to compensate for a lack of pixel information, thereby forming a video with a predetermined aspect ratio; and wherein said information amount converting circuit is comprised:

an image enlarging circuit that enlarges an image obtained by the image pickup element by executing an interpolation process of averaging peripheral pixels;

a binarization circuit that forms a binarized image of the image obtained by the image pickup element;

a binary image enlarging circuit that enlarges the binary image using an interpolation process; and an addition circuit that adds data obtained by applying a weighting factor to binary data output from the binary image enlarging circuit, to image data output from the image enlarging circuit.

2. The electronic endoscope apparatus according to claim 1, wherein said processor comprises a determination circuit for determining the number of pixels for the image pickup element mounted on the electronic endoscope by communicating with the electronic endoscope when the power is turned on.

3. The electronic endoscope apparatus according to claim 1, wherein said information amount converting circuit sets said weighting factor applied to said binary data, depending on an average value for peripheral pixels.

4. The electronic endoscope apparatus according to claim 1, wherein said information amount converting circuit sets said weighting factor applied to said binary data, depending on an average value for peripheral pixels having a pixel value larger than a predetermined threshold.

* * * * *